United States Patent [19]

Johnstone

[11] 4,267,447
[45] May 12, 1981

[54] METHODS AND APPARATUS FOR MEASURING THERMAL NEUTRON DECAY CHARACTERISTICS OF EARTH FORMATIONS

[75] Inventor: Charles W. Johnstone, Houston, Tex.

[73] Assignee: Schlumberger Technology Corp., Houston, Tex.

[21] Appl. No.: 130,511

[22] Filed: Mar. 14, 1980

Related U.S. Application Data

[62] Division of Ser. No. 955,176, Oct. 26, 1978, Pat. No. 4,224,516.

[51] Int. Cl.$^3$ .............................................. G01V 5/00
[52] U.S. Cl. ................................... 250/262; 250/269
[58] Field of Search ................ 250/262, 265, 269, 270

[56] References Cited

U.S. PATENT DOCUMENTS

| Re. 28,477 | 2/1971 | Nelligan | 250/262 |
|---|---|---|---|
| 3,373,280 | 3/1968 | Mills | 250/262 |
| 3,662,179 | 5/1972 | Frentrop et al. | 250/262 |
| 3,706,884 | 12/1972 | Youmans | 250/269 |
| 3,890,501 | 6/1975 | Johnstone | 250/265 |
| 3,971,935 | 7/1976 | Nelligan | 250/262 |
| 4,097,737 | 6/1978 | Mills | 250/269 |
| 4,157,469 | 6/1979 | Randall | 250/262 |

*Primary Examiner*—Alfred E. Smith
*Assistant Examiner*—Janice A. Howell

[57] ABSTRACT

In the exemplary embodiments of the invention disclosed, thermal neutron decay characteristics of an earth formation, e.g. the thermal neutron decay time constant $\tau$ and the macroscopic capture cross section $\Sigma$, are measured by detecting indications of the thermal neutron concentration in the formation during a selected set of two different measurement intervals between neutron bursts and forming a ratio of such measurements, as accumulated for an appropriate length of time, from which the measured value of the decay characteristic is derived. The particular set of measurement intervals used is selected from among a number of possible sets as a function of a previously measured value of the decay characteristic. Each measurement interval set is used over only a specific range of decay characteristic values for which it has been determined, in accordance with a previously established relationship between the decay characteristic value and the ratio of the thermal neutron concentration measurements for the set, to afford enhanced statistical accuracy in the measured value of the decay characteristic. The measured value of the decay characteristic is then determined from the actual measured value of the ratio for the selected measurement interval set and the previously established relationship for that set. Each measurement interval preferably consists of a plurality of contiguous, discrete time gates whose durations and times of occurrence are adjustable in common by a finite number, e.g. four, of discrete scale factor values F. Each F value corresponds to a specific range of decay characteristic values, with the F value used for any given measurement being selected on the basis of a previously measured value of the decay characteristic. Regions of overlap are provided between the decay characteristic value ranges for adjacent F values so that F need not be changed merely as a result of statistical variations in the decay characteristic.

21 Claims, 6 Drawing Figures

METHODS AND APPARATUS FOR MEASURING THERMAL NEUTRON DECAY CHARACTERISTICS OF EARTH FORMATIONS

RELATED CASES

This application is a divisional of U.S. application Ser. No. 955,176, filed Oct. 26, 1978, and now U.S. Pat. No. 4,224,516. Certain portions of the specification and drawings of application Ser. No. 955,176 which are not directly germane to the invention claimed in this application have been omitted herefrom for brevity. All such portions are hereby incorporated into this application by reference.

BACKGROUND OF THE INVENTION

1. Field of the Invention

The present invention relates in general to the measurement of the rate of decay, or capture, of thermal neutrons in earth formations and, more particularly, to new and improved methods and apparatus for measuring thermal neutron decay time constants and related capture cross sections of earth formations traversed by a well bore. It also relates to improved methods and apparatus for compensating for the influence of background radiation on primary measurements of interest.

2. The Prior Art

Heretofore, pulsed-neutron capture logs have provided measurements of thermal neutron capture characteristics of earth formations, e.g. the thermal neutron decay time constant ($\tau$) and its correlative the macroscopic capture cross section ($\Sigma$), which have proven useful in differentiating between oil or gas-bearing formations and water-bearing formations. Such logs are especially useful in recognizing the presence of hydrocarbons in cased formations, and to detect changes in water saturation during the production life of a well.

Thermal neutron characteristic measurements are typically made by irradiating a formation with bursts of fast (e.g. 14 Mev) neutrons and following the decay of the thermal neutron concentration in the formation by counting the gamma rays emitted by formation nuclei upon the capture of thermal neutrons during discrete time intervals, or gates, following each neutron burst. In one prior tool disclosed in U.S. Pat. No. 3,379,882 to A. H. Youmans, the capture gamma rays are measured during two gates which are fixed both in time of occurrence after the burst and in duration. Although affording useful information in formations of average decay times, the Youmans fixed-gate system tends to yield unreliable measurements where the decay time of the formation is either very long or very short. Moreover, the gamma ray count rate measurement during the second fixed-gate is sometimes subject to excessive statistical variation, particularly in short decay time formations. In an important advance over the fixed-gate system, W. B. Nelligan in U.S. Pat. No. 3,566,116 (now U.S. Pat. No. Re. 28,477) patented a sliding-gate system in which three measurement gates are utilized and in which the time-after-burst occurrence and duration of all of the gates are automatically varied, in a feed-back loop operation, according to the currently measured value of the decay time constant. The first two gates are timed to detect capture gamma rays from the formation and the third gate is timed to detect background gamma rays. This system operates properly to position the gates for optimum background-corrected measurements over a wide range of decay times $\tau$ and cross sections $\Sigma$, thereby avoiding the deficiencies in respect of unreliability and statistical variation encountered in the fixed-gate system in cases of extreme decay rates. For still better results, Nelligan further provides that the duration and repetition rate of the neutron bursts could also be varied as a function of the currently measured decay time value. This affords the added advantage of maximizing the duty cycle of the neutron generator in a manner consistent with accurate measurement of the decay time value of the formation being logged. Later embodiments of the Nelligan sliding-gate concept are described in U.S. Pat. No. 3,662,179, granted May 9, 1972 to Frentrop et al., and U.S. Pat. No. 3,890,501 granted June 17, 1975 to C. W. Johnstone. Thermal neutron decay time logging, in accordance with the Nelligan sliding-gate technique as described in the aforementioned patents, is provided commercially by Schlumberger Well Services, and has become a widely accepted and important cased-hole service.

It is desirable, however, to improve still further this service. Specifically, it is desirable to provide still greater statistical precision in the measurements of $\tau$, $\Sigma$ and background by improvement in the manner of detection of the rate of decay of the thermal neutron concentration. Also, the infinitely variable, feed-back loop type of operation previously used with the Nelligan sliding-gate system is sometimes subject to "jitter" when low counting rates are encountered. That is to say, variations in the settings of the measurement gates and the neutron bursts sometimes result from statistical variations in the gamma ray count rates rather than as the result of any change in the decay time of the formation under investigation. Again, where the decay time drops sharply, such as at bed boundaries, the feed-back loop of the sliding-gate tool sometimes, though infrequently, fails to change the timing of the gates fast enough to keep up with the fall off in the gamma ray count rate. This could result in the tool measuring insufficient count rates for the feed-back loop to work properly, which situation could in turn leave the gates and bursts "latched" at positions later after the burst than would be optimum for the new decay time. Although this situation can be readily overridden manually and the gates quickly restored to the proper positions, it is desirable to avoid such inadvertent "latching" of the $\tau$ computation circuits. It additionally is desirable to provide for the measurement of all decay time values over the full $\tau$ range normally encountered, e.g. from $<50$ $\mu$sec to $>600$ $\mu$sec, without any discontinuities.

SUMMARY OF THE INVENTION

The foregoing and other objects are attained, in accordance with the invention, by the provision of methods and apparatus for measuring thermal neutron decay characteristics of earth formations in which the decay of the thermal neutron concentration in a formation is measured during a certain set of two different measurement intervals following irradiation of the formation with discrete bursts of fast neutrons, the particular set of measurement intervals used being selected from among a number of possible sets of two measurement intervals as a function of a previously known value of the decay characteristic to be measured. Each set of measurement intervals corresponds to a specific range of values of the decay characteristic, and the particular set used for a given measurement is selected as that set whose corresponding decay characteristic value range encompasses the previously known value of the decay characteristic. A ratio is formed of the accumulated thermal neutron concentration measurements made during each of the measurement intervals of the selected set following a number of neutron bursts, and a new value of the decay characteristic is determined as a function of the ratio. The new value of the decay characteristic thus determined is then used as the known value of the decay characteristic for purposes of selecting the particular measurement interval set to be used following a subsequent number of neutron bursts. This cycle is repeated repetitively in the course of a logging run, so that new values of the decay characteristic are periodically being determined as the logging tool traverses a well bore. As the measurement interval set used to determine each new decay characteristic value is selected on the basis of the previously most recent value, not only are changes in the decay characteristic readily and rapidly detected but the actual measurement interval set used in measuring the thermal neutron concentrations also is automatically changed in correspondence with the change in the decay characteristic properly to locate the measurement intervals for maximum statistical accuracy in the determination of the decay characteristic value.

In accordance with the invention, an empirical relationship is previously established between the decay characteristic value and the ratio of accumulated thermal neutron concentration measurements for each set of measurement intervals. Preferably, this relationship and the times of occurrence of the measurement intervals in the corresponding interval set are determined so as to afford the minimum deviation in the measured value of the decay characteristic over the full range of values thereof corresponding to that set of measurement intervals. The new value of the characteristic is then determined in practice from the actual measured value of the ratio and the empirical relationship for the selected measurement interval set used in making the thermal neutron concentration measurements. Where the decay characteristic being measured is the thermal neutron decay time constant $\tau$, the empirical relationship suitably is a linear relationship in the form $\tau = a + b\ R^{-1}$, where $R^{-1}$ is the inverse of the ratio of the measurements made in the selected interval set and a and b are constants relating $\tau$ and $R^{-1}$ over the range of $\tau$ values corresponding to the selected measurement interval set.

In a preferred embodiment, the thermal neutron concentration in a formation is observed in a sequence of contiguous, discrete time gates which begins following a discrete time delay after termination of the preceding neutron burst and extends over the remainder of the period between bursts. Each measurement interval set then preferably comprises two different groups of such discrete time gates, one group of which, consisting of the earlier-occurring gates, becomes the numerator of the measurement ratio and the other group of which, consisting of the later-occurring time gates, becomes the denominator of the ratio. Advantageously, though not necessarily, the time gates included within each group are contiguous in time so as to define, in effect, two single, large measurement intervals. As will be understood from the foregoing, each set of time gates, i.e., measurement intervals, will correspond to a particular range of decay characteristic values for which it affords statistically accurate measurements of the decay characteristic. The gate set to be used following any given number or series of neutron bursts will thus be that set whose corresponding decay characteristic value range encompasses the most recently determined value of the characteristic.

Preferably, the durations and times of occurrence of the discrete time gates are adjustable in common by a finite number, e.g. four, of discrete scale factor values F. If desired, the duration and repetition period of the neutron bursts may likewise be adjustable by the F values. In accordance with the invention, each scale factor value F corresponds to a particular range of values of the decay characteristic for which it has been determined to afford enhanced statistical precision in the measured value of the characteristic. As with the gate set (measurement interval set) to be used, the particular F value to be used for any given measurement preferably also is selected on the basis of the previously-measured value of the decay characteristic. Suitably, however, regions of overlap are provided between the ranges for adjacent F values. This permits either of two F values to be used when the previously measured decay characteristic value is within a region of overlap, thereby avoiding changes in the F value merely as a result of statistical variation in the measured value of the characteristic. In a preferred embodiment, each overall range of decay characteristic values corresponding to a scale factor value F is further broken up into a number, e.g. seven, of sub-ranges, each of which sub-ranges has a specific gate set corresponding thereto. In the preferred embodiment, therefore, the actual gate set to be used in making the thermal neutron concentration measurements is that set whose decay characteristic value range both falls within the overall range for the F value selected on the basis of the previously measured characteristic value and also encompasses such previously measured new value.

As a further feature of the invention, improved methods and apparatus are provided for more accurately measuring, and compensating for, the presence of background signal in pulsed neutron logging measurements, such as, for example, the aforementioned thermal neutron capture gamma ray measurements used in computing $\tau$. In accordance with this feature of the invention, the background intensity is averaged over a longer time period than the principal radiation measurement of interest and is then subtracted from, or otherwise combined with, the principal measurement to compensate it for background. The background measurement is preferably repeated at predetermined time intervals to afford updated background measurements.

BRIEF DESCRIPTION OF THE DRAWINGS

For a better understanding of the invention, reference may be made to the following description of exemplary embodiments thereof, taken in conjunction with the figures of the accompanying drawings, in which.

DETAILED DESCRIPTION

Figures 1, 4A, 4B:
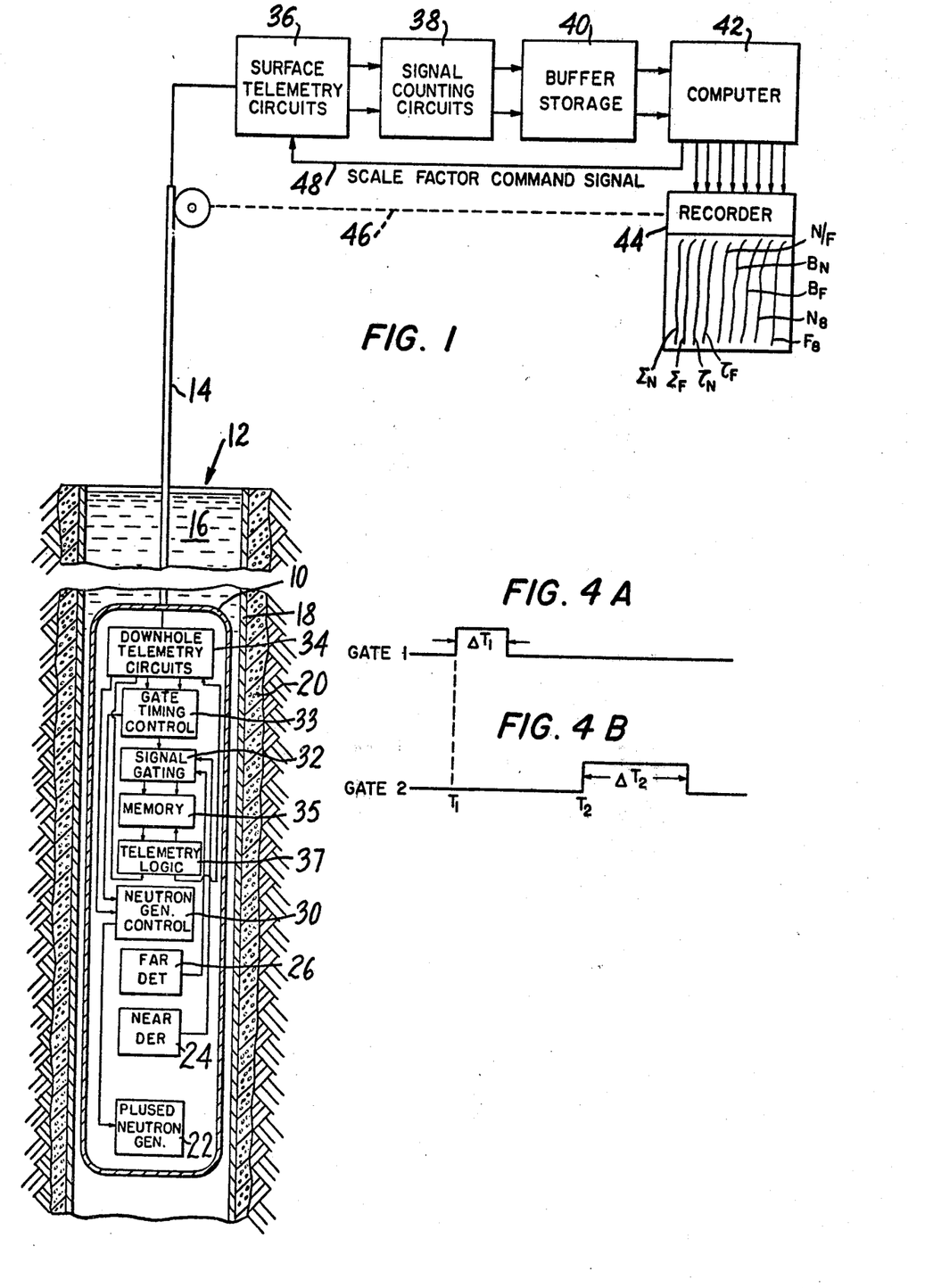
FIG. 1 is a schematic view of a representative well logging tool construction in accordance with the invention.
FIGS. 4A and 4B illustrate two generalized time gates for measuring thermal neutron concentrations.

In the exemplary embodiment of FIG. 1, a well logging tool constructed in accordance with the invention includes a fluid-tight, pressure-and-temperature resistant sonde or tool 10 that is adapted to be suspended in and moved through a well bore 12 by an armored cable 14. The well bore 12 is illustrated as containing a borehole fluid 16 and as including a steel casing 18 and surrounding cement annulus 20. Although no tubing is shown in the borehole, the tool 10 may if desired be sized for through-tubing use.

The downhole tool 10 includes a pulsed neutron generator 22 and two radiation detectors 24 and 26 that are located at different spacings from the neutron generator 22. The detector 24 spaced closest to the neutron generator is designated the "near" detector and the detector 26 located farther from the neutron source is designated the "far" detector. For the purpose of the present invention, the neutron generator 22 is preferably of the type which generates discrete pulses of fast neutrons, e.g. 14 Mev., and may for example be of the types described in more complete detail in U.S. Pat. No. 2,991,364 to C. Goodman, dated July 4, 1961, and U.S. Pat. No. 3,546,512 to A. H. Frentrop, dated Dec. 8, 1970. Operation of the neutron generator 22 is controlled in part by a neutron generator control circuit 30, and this curcuit may also be of the types described in the aforementioned patents. The detectors 24 and 26 may be of any construction suitable for the detection of the thermal neutron concentrations in the surrounding earth formation and, to that end, may be of the thermal neutron sensitive type, e.g. helium 3 filled proportional counters, or of the gamma ray sensitive type, such as thallium-activated sodium iodide detectors. In the preferred embodiment, the detectors 24 and 26 preferably comprise sodium iodide scintillation detectors and, in this respect, will be understood to include the usual photomultiplier tubes, photomultiplier high voltage supplies, and amplifier-discriminators (not shown). It will also be understood that other downhole power sources (not shown) are provided as required to drive the neutron generator 22 and other downhole circuits. Power for the well tool 10 is supplied over the cable 14 from a surface power supply (not shown), as is conventional.

Output pulses from the near detector 24 and the far detector 26, representative of the concentration of thermal neutrons in the irradiated formation, are applied to signal gating circuits 32. The signal gating circuits 32 are controlled by gate timing circuits 33, which also control the operation of the neutron generator control circuit 30. From the signal gating circuits 32 the detector signals are counted and stored in memory circuits 35 and thence, under control of telemetry logic circuits 37, are applied to downhole telemetry circuits 34 for transmission to the surface over the cable 14. The overall operation of the neutron generator control circuit 30, the signal gating circuits 32, the gate timing circuits 33, the memory circuits 35, and the telemetry circuits 34 is described in detail hereinafter in connection with FIGS. 3-12. These circuits in part constitute the subject matter of the copending, commonly-owned U.S. application Ser. No. 955,175 now U.S. Pat. No. 4,223,218 for "Methods and Apparatus for Optimizing Measurements of Thermal Neutron Decay Characteristics", filed concurrently herewith by L. A. Jacobson. They are nonetheless being disclosed herein in full for purposes of completeness of disclosure.

The downhole telemetry circuits 34 may be of any known construction for encoding, time division multiplexing, or otherwise preparing the data-bearing signals applied to them from the telemetry logic circuits 37 and for impressing such data on the cable 14. At the earth's surface, the data-bearing signals from the near and far detectors 24 and 26, respectively, are amplified, decoded, demultiplexed and otherwise processed as needed in the surface telemetry circuits 36, which may also be conventional. The telemetry circuits 34 and 36 also include circuits for the receipt and transmission, respectively, of command messages from the surface for the purpose of selection of the scale factor value F to be used, as is described more fully hereinafter. Suitably, therefore, the circuits 34 and 36 comprise a bi-directional data telemetry system useful for these purposes and having a 10 K bit per sec upward data rate.

Following circuits 36 the near-detector and far-detector signals are separately counted in signal counting circuits 38 to acquire the thermal neutron decay curve data over a desired accumulation interval $\Delta t$. Upon termination of the data accumulation time $\Delta t$, which may be selected, for example, to correspond to a desired interval of depth in accordance with logging speed of the tool, the count rate data accumulated in the signal counting circuits 38 are transferred to buffers 40 and the signal counting circuits 38 are reset to zero.

From storage 40, the count rate data are processed in a computer 42, which suitably comprises a microprocessor or, alternatively, a general purpose digital computer such as that manufactured by Digital Equipment Corporation, Maynard, Mass., under the designation PDP-11. As is described more fully hereinafter, the computer 42 processes the count rate data from the respective detectors to develop various desired outputs, including, for example, the decay time constants $\tau_N$ and $\tau_F$ for the near and far detector, respectively, the corresponding macroscopic capture cross sections $\Sigma_N$ and $\Sigma_F$, and various other selected outputs such as a ratio (N/F) of count rates from the near and far detectors, background counting rates ($B_N$ and $B_F$) from the respective detectors, and the net count rates from certain time gates, e.g. $N_8$ and $F_8$, for both detectors. All of these outputs may be recorded in conventional fashion as a function of tool depth in a recorder 44. The usual cable-following mechanical linkage, indicated diagrammatically at 46 in FIG. 1, is provided for this purpose. As is illustrated by line 48 in FIG. 1, the computer 42 transmits an appropriate scale factor command signal to the surface telemetry circuits 36 for transmission downhole to the gate timing control circuits 33 for real time adjustment of the timings and durations of the detection gates for the near and far detectors 24 and 26 and, if desired, for the duration and repetition rate of the neutron bursts as well.

Figure 2:
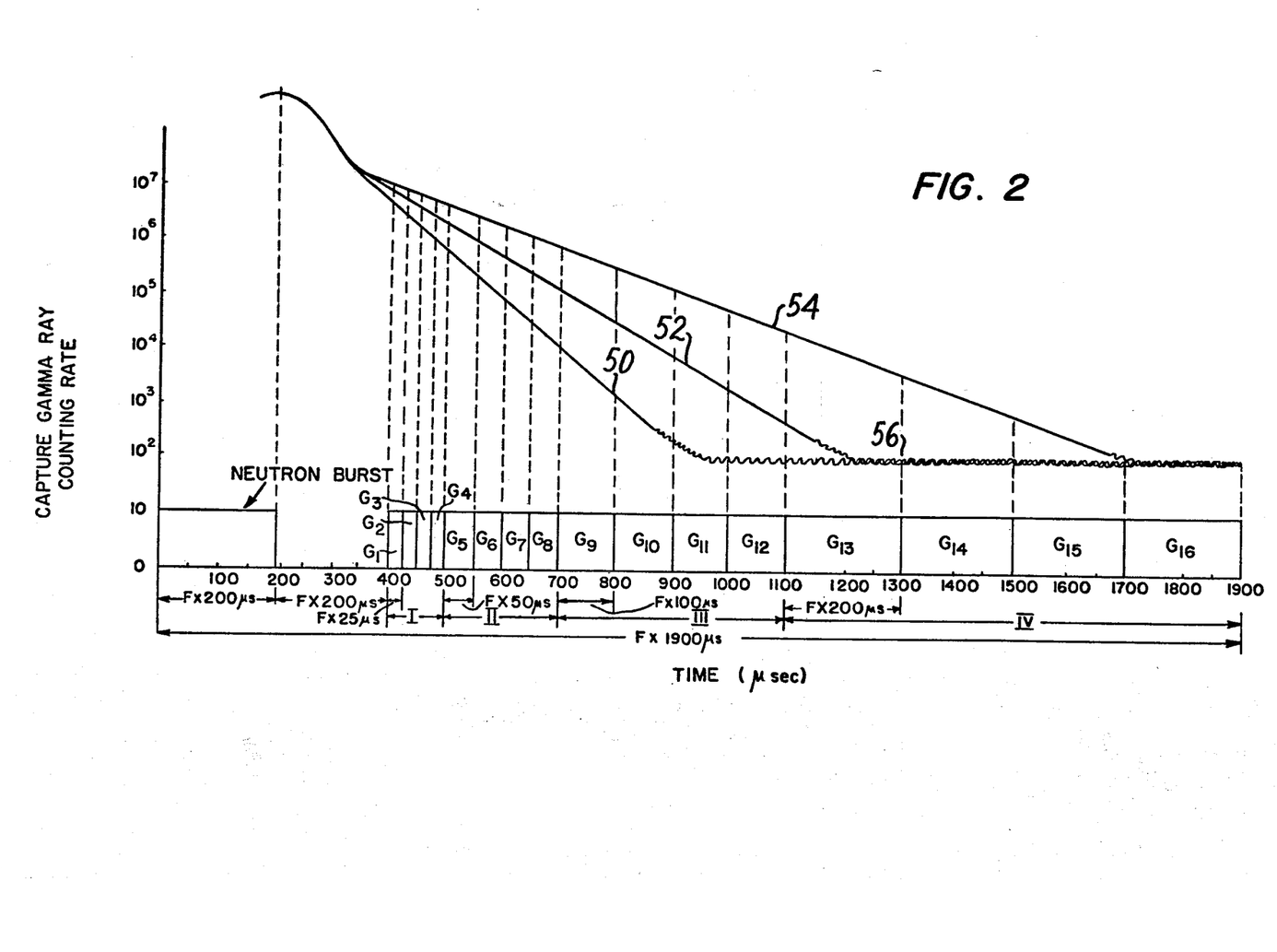
FIG. 2 is a graphical representation of illustrative thermal neutron concentration decay curves in three different formations and showing superimposed thereon a preferred neutron generator and detector gating regime in accordance with the invention.

In the graphical representation of FIG. 2, three decay curves 50, 52 and 54 represent, respectively, the variation with time of the logarithmic counting rate of thermal neutron capture gamma rays following irradiation of earth formations having short, medium and long decay times (rates of decay) of thermal neutron concentration. For purposes of comparison, the curves 50, 52 and 54 are shown as normalized to approximately the same peak counting rate although, as will be appreciated, this is not normally the practice. The variable tailing portion 56 of each curve represents background, and this too has been shown as being at approximately a constant level of intensity for purposes of illustration.

As is well known, the slope of the thermal neutron decay curve for a formation is indicative of the thermal neutron decay time constant $\tau$ of the formation, and it is a feature of the present invention that the decay curve, and thus $\tau$, may be more precisely detected or measured than has been possible heretofore. In furtherance of this object, sixteen discrete time intervals or gates $G_1$–$G_{16}$ are provided between successive neutron bursts. As illustrated in FIG. 2, the gates $G_1$–$G_{16}$ constitute a sequence of discrete time gates, which sequence begins after a finite time delay following the termination of the preceding neutron burst and extends over the entire, or substantially the entire, remainder of the interval between neutron bursts. Advantageously, though not necessarily, the gates are contiguous in time. The purpose of the time delay between the preceding neutron burst and the beginning of the gating sequence is to permit gamma rays emanating from the immediate borehole environment, e.g. borehole fluid, casing, cement annulus, tool housing, etc., to die out before detection of the count rate data from the formation is commenced. As indicated in FIG. 2, the discrete time gates $G_1$–$G_{16}$ are divided into four groups I, II, III and IV of four gates each, i.e. time gates $G_1$–$G_4$ comprise gate group I, time gates $G_5$–$G_8$ comprise gate group II, time gates $G_9$–$G_{12}$ comprise gate group III, and time gates $G_{13}$–$G_{16}$ comprise gate group IV. Within each gate group, the discrete time gates are of equal duration. Hence, each of gates $G_1$–$G_4$ has the same duration, e.g. 25 microseconds ($\mu$s), and, similarly, the individual time gates of each of gate groups II, III and IV are also of equal duration. However, the duration of the time gates increases progressively from gate group to gate group in the sequence. The increase is incremental, i.e. by a finite factor, and preferably the degree of increase is a multiple of the time gate duration of the next preceding gate group. A multiple of two has been found advantageous. Thus, the duration of the discrete time gates $G_5$–$G_9$ in gate group II is preferably twice the duration of the discrete time gates $G_1$–$G_4$ in gate group I, i.e. 50 $\mu$s. The duration of the individual time gates $G_9$–$G_{12}$ in gate group III is then twice the duration of the individual time gates $G_5$–$G_8$ in gate group II, i.e. 100 $\mu$s, and the duration of the individual time gates in gate group IV is twice that of the Group III gates, i.e. 200 $\mu$s. It will be understood that either or both the specific durations of the gates within each group and the amount of the increase in gate durations between groups may be varied as desired from the values shown. Also, both the number of gate groups and the number of discrete time gates within each gate group may likewise be varied from the four-four scheme shown in FIG. 2.

By thus employing narrow gates early in the gating sequence and wider gates later in the gating sequence, the narrowest gates are concentrated in the early regions of the thermal neutron decay curves 50, 52 and 54 where the rate of change in counting rate is the greatest. Further, not all of the time gates need be included in the $\tau$ computation, but rather only those containing significant decay signal. Thus not only is a degree of data compaction achieved through the use of detection time gates of variable duration with time after the neutron burst, but greater precision is provided by excluding from the $\tau$ computation counting rates from time gates which are subject to undue statistical variation, such as the later gates in short $\tau$ formations. As described more fully hereinafter, the particular gates to be employed in computing $\tau$ are selected on the basis of a prior measurement of $\tau$ during the same logging run, and are those gates which have been determined empirically to give the minimum statistical variation in the measured value of $\tau$ over a finite $\tau$ range spanning the previously measured value.

It has been found, in accordance with the invention, that in addition to providing time gates $G_1$–$G_{16}$ which increase in width as a function of time after the neutron burst, even better results are obtained by providing for selected, incremental adjustment of the durations of the discrete time gates $G_1$–$G_{16}$, and, if desired, also of the durations and repetition period of the neutron burst and the duration of the discrete time delay between the end of the burst and the beginning of the gating sequence, as a function of a previously measured value of $\tau$. The object is to so position the gates $G_1$–$G_{16}$, neutron burst, etc., that the counting rates in all of the gates used in the $\tau$ computation, i.e., the early gates, the mid-range gates and later gates as the case may be, will be sufficiently high for reliable statistical precision in the $\tau$ measurement. It is desirable, therefore, in effect to shift the time placement of the detection time gates, neutron burst, etc. as the $\tau$ of the formation, and thus the rate of decay of the thermal neutron concentration curve, varies. Such time interval adjustment is accomplished by multiplying each time interval to be adjusted in duration by a common selected value of a finite number of discrete scale factor values F. This is illustrated in FIG. 2, where the duration of the neutron burst is shown as $F \times 200$ $\mu$sec, the duration of the delay as $F \times 200$ $\mu$sec, the duration of each of gates $G_1$–$G_4$ as $F \times 25$ $\mu$sec, and so on. As also shown in FIG. 2, the next succeeding neutron burst is preferably contiguous in time with the end of time gate $G_{16}$, whereby not only the duration of the neutron burst may be adjusted by the scale factor value F but also the repetition period between successive nuetron bursts, as indicated by the value $F \times 1900$ $\mu$sec. Hence, it will be appreciated that by changing the value of the scale factor F the counting rate times for the various gates may be uniformly changed relative to the neutron burst in a manner to optimize the detection of the thermal neutron concentration decay in the particular formation at hand. That is to say, by selection of the scale factor F the individual gates $G_1$–$G_{16}$ may be expanded or contracted along the time base of the thermal neutron decay curve as the rate of change of the curve, and thus $\tau$, varies.

By providing for a finite number of incremental changes in the widths of the detection time gates, it is possible to locate the time gates properly relative to the portion of a thermal neutron decay curve that is most representative of decay of the thermal neutron concentration in the earth formation, namely the straight line portion of the curve appearing on a semi-log plot such as that of FIG. 2, so as to maximize counting rates within the gates and thereby improve precision in the measurement of the $\tau$, while at the same time avoiding the necessity for the infinitely variable electronic gates used in prior logging tools. It has been found, for instance, that if three or less F values are used, the later gates used to compute $\tau$ include too much background. This results in greater statistical uncertainty, necessitates measurement of background over unduly long accumulation periods, and requires a separate background computation for nearly all $\tau$ comutations. These deficiencies can be largely, if not entirely, eliminated by use of a higher number, e.g. 5 or 6, of scale factor values F. Generally the more incremental values of the scale factor F provided, the greater the statistical reliability achieved. On the other hand, tool complexity increases with increased numbers of scale factor values. Accordingly, it has been determined in accordance with the invention that 4 incremental values of F will afford improved statistical performance over the full $\tau$ range of interest, commensurate with a minimum of tool complexity.

The amount of incremental change between F values should be selected, in conjunction with the specific durations assigned to the gates in gate groups I, II, III and IV, to enable accurate detection of the decay curves over the full range of $\tau$'s expected to be encountered in the earth formations, e.g., from $<50$ $\mu$sec to $>600$ $\mu$sec. For the gate widths of 25 $\mu$sec, 50 $\mu$sec, 100 $\mu$sec and 200 $\mu$sec shown in FIG. 2, it is preferred in accordance with the invention to change F by increments of $\sqrt{3}$. The preferred values of F, therefore, are $1/\sqrt{3}$, 1, $\sqrt{3}$ and 3. Also, as described hereinafter, incrementing F by a factor of $\sqrt{3}$ affords circuit advantages in implementing the F factor procedure in the logging tool. (See U.S. application Ser. No. 955,176 for omitted description.)

Figure 3:
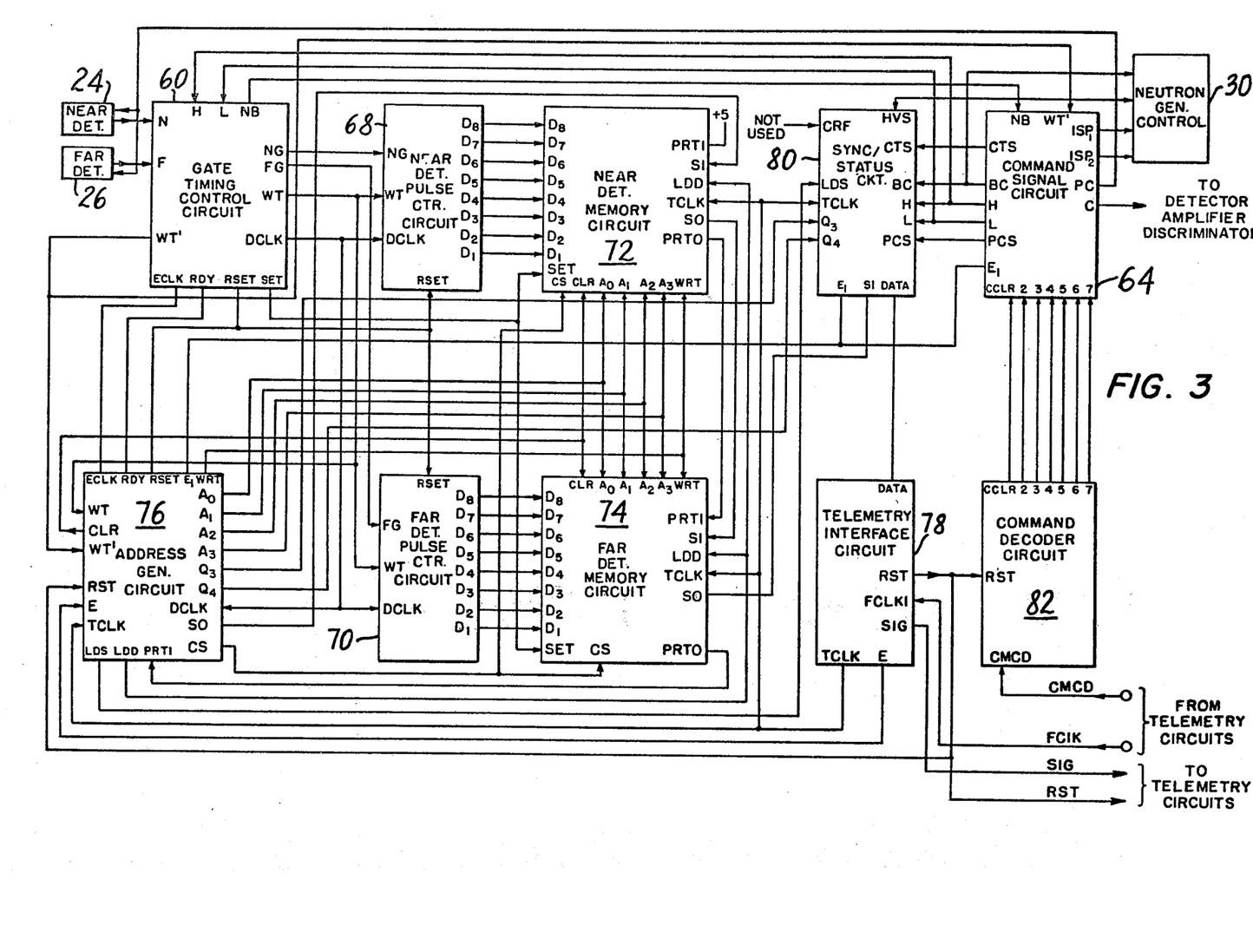
FIG. 3 is a block diagram of the downhole control, gating, memory and telemetry circuits of FIG. 1.

FIG. 3 is a block diagram showing the interconnections between the neutron generator control circuit 30, the signal gating circuit 32, the gate timing control circuit 33, the memory circuits 35, and the telemetry logic circuits 37. The interface between these circuits and the telemetry circuits 34 is also indicated. When the tool is powered-up to begin a run the inputs H and L to the gate timing control circuit 60, which as illustrated combines the circuits 32 and 33 from FIG. 1, are automatically set equal to logic 0. The timing control circuit 60 generates four discrete clock frequencies, each corresponding to one of the scale factor values $F=1/\sqrt{3}$, 1, $\sqrt{3}$ and 3. By changing the logic state of the H and L inputs, selection may be made of the particular frequency, and hence F value, that is to be used. It is assumed here that the logic state 0 corresponds to $F=1$. As described more fully in application Ser. No. 955,176 in connection with FIG. 6, the output frequency signal is then sent to a series of scalers, i.e. counter/divider circuits, and decoders within circuits 60 and is used to generate all of the timing signals for controlling the operation of the neutron generator 22 and the gating of the near and far detectors 24 and 26.

Thus, the timing circuit 60 produces a neutron burst signal NB that is applied to a command signal circuit 64, which in response thereto generates two ion sources pulses (ISP$_1$ and ISP$_2$) that drive the neutron generator control circuits 30 (see also FIG. 1) thus causing the neutron generator 22 to produce bursts of neutrons of the desired duration and repetition rate. The detectors 24 and 26 are preferably blanked during and immediately following each neutron burst to isolate the downstream electronics against excessively huge instantaneous count rates. To that end, the timing generator 60 also generates an appropriate blanking pulse to block the detector outputs for a specific period, e.g., twice the duration of the burst. This is described in more detail in U.S. application Ser. No. 955,176 in connection with FIG. 6 thereof.

The timing gate signal generated by timing generator 60 is denoted DCLK, and this signal is used to gate the detectors in accordance with the regime of FIG. 2. In general, this is done by supplying four frequencies related to each other by a factor of two to a multiplexer under the control of a count-by-four circuit. The multiplexer output is supplied to the counter so that four pulses of the highest frequency are passed through the counter before it switches to pass four pulses of a frequency half that of the highest frequency, until all of the timing gate signal, DCLK, is generated. The timing gate signal DCLK in turn creates memory control pulses WT, SET, and RDY for use elsewhere in the system. The manner in which the DCLK, WT, SET and RDY signals are generated is explained in detail in U.S. application Ser. No. 955,176 with reference to FIG. 6 thereof.

The gated near and far detector signals, NG and FG, are supplied to near detector pulse counter circuit 68 and far detector pulse counter circuit 70, respectively. In these circuits, the pulses from each detector for each gate period $G_1$-$G_{16}$ are counted and a binary number representing that value is transferred in parallel to near and far memory circuits 72 and 74. Each pulse counter circuit actually has two counters. While one of the counters is counting the pulses in one time gate, the other is transferring the results of the previous count to the memory. Two counters are necessary because the time gates are contiguous and there is not enough time for one counter to do both operations. A typical detector pulse counter circuit is shown and described in more detail in U.S. application Ser. No. 955,176 in connection with FIG. 7 thereof.

Each of the memory circuits 72 and 74 store sixteen 8-bit words which represent the accumulated count for each time gate $G_1$-$G_{16}$ over a number of neutron irradiation intervals. This is done by addressing the memories via an address generator circuit 76 so that the previous value of the accumulated counts for the time gate in question is presented at the input. The memory output is then added to the current count for that gate and the result is again stored in the memory at the address for that time gate. The manner in which the address generator 76 controls the memory circuits is discussed in more detail in U.S. application Ser. No. 955,176 in connection with FIGS. 8 and 9 thereof.

At a predetermined time a signal, FCLK, from the telemetry circuits 34 informs the tool that the accumulated counts for the sixteen gates $G_1$-$G_{16}$ are to be sent uphole. The FCLK signal is received in telemetry interface circuit 78, which generates an E signal and a TCLK signal that are applied to the memory address generator 76 for use in generating signals LDD in address generator circuit 76 that are in turn applied to the memory circuits 72 and 74 to effect transfer of the contents of each memory location, along with generated parity bits, into parallel-to-serial shift registers (not shown in FIG. 3). The TCLK signal then causes the data to be serially shifted from near memory circuit 72 through far memory circuit 74 so that the far detector count rate data for each gate is placed in front of the near detector data for that gate. This string of data is then passed through sync/status circuit 80 which positions a 4-bit sync code and status information word at the beginning of the information to form the DATA signal. The DATA signal is in the form of a binary signal, arranged according to FIG. 10 of U.S. application Ser. No. 955,176, which is sent to the telemetry interface circuit 78 and thence as signal SIG to the telemetry circuits 34 for transmission uphole. In this respect, the interface circuit 78 functions primarily to make sure that the telemetry circuits 34 are ready to receive the data before it is sent. The operation of sync/status circuit 80 and telemetry interface circuit 78 are set forth more precisely in U.S. application Ser. No. 955,176 with respect to FIGS. 11 and 12 thereof. (See U.S. application Ser. No. 955,176 for omitted description of detailed structure and operation of FIG. 3 components.)

The preferred procedure for computing $\tau$ from the near detector count rates $N_1$-$N_{16}$ in accordance with the invention will now be described. As previously mentioned, the signal counting circuits 38 at the surface accumulate the count rate data for a time $\Delta t$ before transferring the data to the buffer storage 40 and being reset to begin a new counting sequence. Accordingly, the counts per time gate, i.e., $N_1$-$N_{16}$ for the near gates $NG_1$-$NG_{16}$, respectively, and $F_1$-$F_{16}$ for the far gates $FG_1$-$FG_{16}$, respectively, as transmitted to storage 40 and to the computer 42, are not actually count rates but are simply the counts accumulated within each gate over the data accumulation period $\Delta t$. Thus, where the data symbols $N_1$-$N_{16}$ and $F_1$-$F_{16}$ are referred to in the following discussion concerning the computation of $\tau$, it will be understood that these represent total counts over the time $\Delta t$, as the case may be, as distinct from the count rates generated for the respective time gates in the downhole scalers. To that end, an internal clock is provided in the surface equipment to measure the duration $\Delta t$ of each accumulation period in order to obtain accurate count rates for each gate.

In broad terms, the procedure followed in computing $\tau$, and thereafter in selecting the scale factor F, is as follows:

New values of $\tau$ are calculated periodically for each detector based on ratios R formed for each detector from the respective net (background-corrected) count rates, as accumulated at the surface over the period $\Delta t$, from selected sets of time gates. These values are hereinafter designated $\tau_N$ for the near detector values and $\tau_F$ for the far detector values. As is explained more fully hereinafter, there are preferably seven sets of gates, each corresponding to a different ratio R, for each of the four scale factors F. The particular combination of gates making up each ratio R is that combination which has been found to minimize the dispersion of $\tau$ on a given interval of $\tau$, chosen as the interval of validity of the corresponding ratio. Although the same set of gates is used in computing both $\tau_N$ and $\tau_F$, it is selected on the basis of a previously measured value of $\tau_N$ only and is that set which is valid for such value of $\tau_N$ for the F value then in use. Using the gates thus identified, the ratios $R_N$ and $R_F$ are computed. The new values of $\tau_N$ and $\tau_F$ are then calculated from linear equations in the form:

$$\tau = a + b R^{-1} \quad (1)$$

where a and b are coefficients which establish a linear relationship between $R^{-1}$ and $\tau$ over the interval of validity for that particular ratio R. The values of a and b for each ratio are computed beforehand and stored in the computer as a look-up library. Thereafter, the criteria for determining whether a change in the scale factor F is required are examined based on the new value of $\tau_N$ from Eq. (1). If it is determined that the scale value F must be changed, the appropriate command is sent downhole to the control circuits 33 to select the new F value as above described. Preferably commands to change F are sent only at the beginning of a new data accumulation period $\Delta t$ in order to avoid mixing data taken with two different F values.

This procedure, of course, is carried out repetitively in the course of a logging run, with new values of $\tau_N$ and $\tau_F$ being calculated at the end of each accumulation interval $\Delta t$ and new values of the scale factor F being selected as required. Since, as noted, commands to change F are sent only at the beginning of an accumulation period and since the $\tau$ computation and F selection procedure might well require an appreciable fraction of an accumulation period, commands to change F might be sent downhole at the beginning of every other accumulation period. For instance, for a typical logging speed of 1800 feet per hour, the accumulation time $\Delta t$ at the surface might be approximately 1 second, to provide accumulation times $\Delta t$ and hence $\tau$ measurements, corresponding to 6 inch depth intervals. Changes in F could therefore be made as frequently as once per foot of depth, which is quite adequate to follow the most rapid $\tau$ changes normally encountered, i.e. approximately 100 $\mu$sec per foot.

Figure 5:
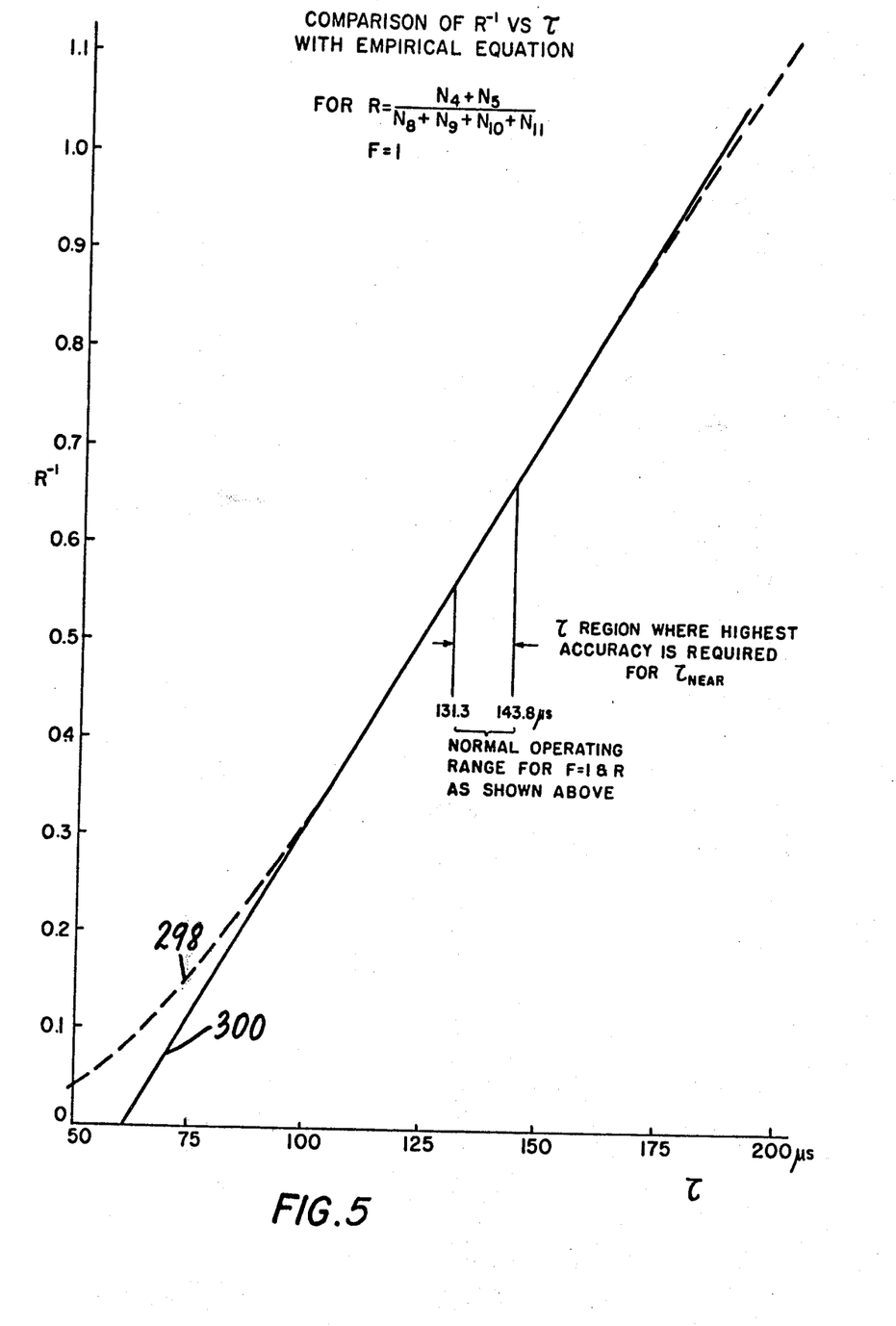
FIG. 5 is a graphical comparison of an exemplary empirical relationship for computing $\tau$ in accordance with the invention with the true relationship for $\tau$ for the example portrayed.

With reference not to FIGS. 4A, 4B and 5, the manner in which a library of gate sets for determining the ratios $R_N$ and $R_F$ and the corresponding values of the coefficients a and b for use in calculating $\tau$ in accordance with Eq. (1) are developed may be seen. As a principal object of the $\tau$-computation procedure is to optimize the statistical precision of the value of $\tau$ obtained therefrom, it is desirable to use as many ratios as possible in order to decrease the statistical uncertainty of the result, but to use each ratio only over its $\tau$ range of validity. In order to ascertain which ratios afford optimum statistical precision in $\tau$ over the range of interest, some preliminary determinations must be made. First, it is desirable to allow for early non-exponential decay of the thermal neutron concentrations. This is done by choosing the first gate in each set as the one which begins most nearly at a time equal to twice the previous $\tau_N$ from the end of the neutron burst. Second, the gates used in the numerator and the gates used in the denominator are preferably contiguous in time. This is equivalent to using counts from only one gate for each of the numerator and denominator, such as the gate $\Delta T_1$ in FIG. 4A and the gate $\Delta T_2$ in FIG. 4B, respectively. Following this, the number and identity of the gates included in each term of the ratio is determined empirically. As the initial step, the mean count rate in each gate is determined from the expression:

$$N_{ij} = \frac{A_o}{T_p} \frac{(1 - e^{-T_B/\tau})}{(1 - e^{-T_B/\tau})} (e^{-T_i/\tau} - e^{-T_j/\tau}) + \frac{B_o T_B}{T_p^2}(T_i - T_j) \quad (2)$$

where: $N_{ij}$ represents the mean number of counts/sec in a gate which begins at a time $T_i$ and ends at a time $T_j$ with respect to the end of the neutron burst, $T_B$ and $T_p$ are, respectively, the duration and repetition period of the neutron burst; and (where the times are expressed in units of seconds) $A_o$ is the total number of decay signal counts that would be detected following a single long burst of neutrons ($T_B < < \tau$) and $B_0$ is the total background counts/sec if a steady neutron flux with the same intensity as that occurring during the neutron burst $T_B$ is assumed.

$A_o$ depends upon peak neutron yield and detector size, efficiency and spacing, as well as on tool environment. $B_o$ depends on all of the foregoing and additionally upon time, since the major contributor to $B_o$ with a NaI detector is the 25 minute neutron activation of I in the detector crystal. Typical observed values of $A_o$ range from 50–100 counts for the near detector and from 9–25 counts for the far detector. $B_o$ builds up to approximately $5 \times 10^4$ counts/sec and $0.6 \times 10^4$ counts/sec for the near and far detectors, respectively.

Using Eq. (2), the gate counting rates are calculated for a given F value. For example, for the case of $F=1$, $\tau=137.5$ μsec, $A_o=50$ counts and $B_o=4 \times 10^4$ cps and using the gate times and durations of FIG. 2, the following counting rate table is obtained:

TABLE V

| Gate | Net cps | Background cps | Gross cps |
|---|---|---|---|
| 4 | 453.9 | 55.4 | 509.3 |
| 5 | 693.9 | 110.8 | 804.7 |
| 6 | 482.4 | 110.8 | 593.2 |
| 7 | 335.2 | 110.8 | 446.0 |
| 8 | 233.0 | 110.8 | 343.8 |
| 9 | 274.6 | 221.7 | 496.3 |
| 10 | 132.8 | 221.7 | 354.5 |
| 11 | 64.1 | 221.7 | 285.8 |
| 12 | 31.1 | 221.7 | 252.8 |
| 13 | 22.2 | 443.3 | 465.5 |
| 14 | 5.2 | 443.3 | 448.5 |
| 15 | 1.3 | 443.3 | 444.6 |
| 16 | 0.2 | 443.3 | 443.5 |

In Table V, the background counting rate is taken as the sum of the counting rates from gates $G_{15}$ and $G_{16}$, as applied proportionately to each gate. Since gates $G_{15}$ and $G_{16}$ are each 200 μsec long, the background counting rate for gates $G_{13}$ and $G_{14}$, each also 200 μsec long, is one-half the $G_{15}$ and $G_{16}$ total, the background counting rate for gates $G_9$–$G_{12}$, each 100 μsec long, is one-quarter the gate $G_{15}$ and $G_{16}$ total, and so forth.

A reasonable set of gates is then selected and the fractional standard deviation $\sigma_R/R$ in the ratio R of the count rates from such gates is calculated from:

$$\frac{\sigma_R}{R} = \sqrt{\left[\frac{\sigma_N}{N_N}\right]^2 + \left[\frac{\sigma_D}{D_N}\right]^2} \quad (3)$$

where: $N_N$ is the numerator net counting rate and $D_N$ is the denominator net counting rate. The standard deviations in the numerator counting rate $\sigma_N$ and the denominator counting rate $\sigma_D$ are given by:

$$\sigma_N = \sqrt{N_G + \left[N_B \frac{\sqrt{B}}{B}\right]^2} \quad \text{and} \quad (4)$$

$$\sigma_D = \sqrt{D_G + \left[D_B \frac{\sqrt{B}}{B}\right]^2} \quad (5)$$

where $N_B$ is numerator background counting rate, $D_B$ is the denominator background counting rate, B is the sum of the counting rates from gates $G_{15}$ and $G_{16}$, $N_G$ is the sum of $N_N$ and $N_B$, and $D_G$ is the sum of $D_N + D_B$.

Using Eq. (3), the fractional standard deviation $\sigma_R/R$ of the ratio is computed for several different background smoothing times, e.g. 1, 2, 4 and 8 seconds. For instance, for the data of Table V the term $\sqrt{B}/B$ in Eqs. (4) and (5) is 0.0336 for a 1-second averaging time, but is only one half of that, or 0.0186, for a 4-second averaging time. With the $\sigma_R/R$ values thus obtained, the fractional standard deviation $\sigma_\tau/\tau$ in $\tau$ is calculated from:

$$\frac{\sigma_\tau}{\tau} = K \frac{\sigma_R}{R} \quad (6)$$

where:

$$K = \frac{\tau}{\frac{\Delta T_1}{e^{\Delta T_1/\tau} - 1} + (T_2 - T_1) - \frac{\Delta T_2}{(e^{\Delta T_2/\tau} - 1)}} \quad (7)$$

where: $\Delta T_1$, $\Delta T_2$, $T_1$ and $T_2$ are the durations and times of the numerator and denominator gates as taken as single long gates in the manner illustrated in FIGS. 4A and 4B in this application.

Repeated solutions of Eqs. (3) and (6) are made for different gate sets, and their respective K values from Eq. (7), until it is determined that the minimum $\sigma_\tau/\tau$ has been found. Some compromise may be required, since a ratio (gate set) which gives the best results with one background smoothing time may not be optimum with another. (See U.S. application Ser. No. 955,176 for omitted description.)

In accordance with the foregoing, a representative library of ratios for the full $\tau$ range of from approximately 50 μsec to approximately 600 μsec might be as follows (for convenience, the symbol G has been omitted from the gate numbers):

TABLE

| $\tau$ Range | F | Ratio | Equation for $\tau$ |
|---|---|---|---|
| $\tau < 61.3$ μs | $\frac{1}{\sqrt{3}}$ | $\frac{1+2}{5+6+7+8+9}$ | $\tau = 21.9 + 40.4\,R^{-1}$ |
| 61.3–68.5 | " | $\frac{2+3}{6+7+8+9+10}$ | $\tau = 27.9 + 42.2\,R^{-1}$ |
| 68.5–75.8 | " | $\frac{3+4}{7+8+9+10+11}$ | $\tau = 33.6 + 43.9\,R^{-1}$ |
| 75.8–83.0 | " | $\frac{4+5}{8+9+10+11}$ | $\tau = 35.4 + 71.6\,R^{-1}$ |
| 83.0–93.8 | " | $\frac{5+6}{9+10+11+12}$ | $\tau = 39.0 + 94.8\,R^{-1}$ |
| 93.8–108.3 | " | $\frac{6+7}{9+10+11+12+13}$ | $\tau = 30.9 + 75.2\,R^{-1}$ |
| $\tau > 108.3$ | " | $\frac{7+8}{10+11+12+13}$ | $\tau = 36.5 + 95.0\,R^{-1}$ |
| $\tau < 106.3$ | 1 | $\frac{1+2}{5+6+7+8+9}$ | $\tau = 38.0 + 69.9\,R^{-1}$ |
| 106.3–118.8 | " | $\frac{2+3}{6+7+8+9+10}$ | $\tau = 48.4 + 73.1\,R^{-1}$ |
| 118.8–131.3 | " | $\frac{3+4}{7+8+9+10+11}$ | $\tau = 58.2 + 76.1\,R^{-1}$ |
| 131.3–143.8 | " | $\frac{4+5}{8+9+10+11}$ | $\tau = 61.3 + 124.1\,R^{-1}$ |
| 143.8–162.5 | " | $\frac{5+6}{9+10+11+12}$ | $\tau = 67.6 + 164.2\,R^{-1}$ |
| 162.5–187.5 | " | $\frac{6+7}{9+10+11+12+13}$ | $\tau = 53.6 + 130.3\,R^{-1}$ |
| $\tau > 187.5$ | " | $\frac{7+8}{10+11+12+13}$ | $\tau = 63.2 + 164.6\,R^{-1}$ |
| $\tau < 184.082$ s | $\sqrt{3}$ | $\frac{1+2}{5+6+7+8+9}$ | $\tau = 65.8 + 121.1\,R^{-1}$ |
| 184.0–205.7 | " | $\frac{2+3}{6+7+8+9+10}$ | $\tau = 83.7 + 126.7\,R^{-1}$ |
| 205.7–227.3 | " | $\frac{3+4}{7+8+9+10+11}$ | $\tau = 100.9 + 131.8\,R^{-1}$ |
| 227.3–249.0 | " | $\frac{4+5}{8+9+10+11}$ | $\tau = 106.2 + 215.0\,R^{-1}$ |
| 249.0–281.5 | " | $\frac{5+6}{8+9+10+11}$ | $\tau = 78.9 + 266.0\,R^{-1}$ |
| 281.5–324.8 | " | $\frac{6+7}{9+10+11+12}$ | $\tau = 72.7 + 265.5\,R^{-1}$ |
| $\tau > 324.8$ | " | $\frac{7+8}{10+11+12+13}$ | $\tau = 109.4 + 285.0\,R^{-1}$ |
| $\tau < 318.8$ | 3 | $\frac{1+2}{5+6+7+8+9}$ | $\tau = 114.0 + 209.7\,R^{-1}$ |
| 318.8–356.3 | " | $\frac{2+3}{6+7+8+9+10}$ | $\tau = 145.0 + 219.4\,R^{-1}$ |

TABLE-continued

| τ Range | F | Ratio | Equation for τ |
|---|---|---|---|
| 356.3–393.8 | " | $\frac{3+4}{6+7+8+9+10}$ | $\tau = 111.0 + 206.3\, R^{-1}$ |
| 393.8–431.3 | " | $\frac{4+5}{7+8+9+10+11}$ | $\tau = 136.2 + 305.1\, R^{-1}$ |
| 431.3–487.5 | " | $\frac{5+6}{8+9+10+11}$ | $\tau = 136.7 + 461.0\, R^{-1}$ |
| 487.5–562.5 | " | $\frac{6+7}{9+10+11+12}$ | $\tau = 126.1 + 460.0\, R^{-1}$ |
| τ > 562.5 | " | $\frac{7+8}{10+11+12+13}$ | $\tau = 189.5 + 494.0\, R^{-1}$ |

There is no simple relationship between R and τ from which τ may be obtained directly once the ratio has been calculated. However, as each ratio R is used over only a limited range of τ, a linear relationship can be established between R and τ which closely approximates the true relationship therebetween. For instance, the dashed curve 298 in FIG. 5 illustrated an example of the true relationship between τ and $R^{-1}$ given by the equation:

$$R = \frac{e^{\frac{T_2-T_1}{\tau}}\left(1-e^{\frac{-\Delta T_1}{\tau}}\right)}{\left(1-e^{\frac{-\Delta T_2}{\tau}}\right)} \quad (8)$$

where the terms $\Delta T_1$, $\Delta T_2$, $T_1$ and $T_2$ are defined according to FIGS. 4A and 4B.

Eq. (8) is solved with assumed values of τ over the range 50 μsec to 200 μsec, using the gate set $(G_4+G_5)/(G_8+G_9+G_{10}+G_{11})$, where $G_4=25$ μsec, $G_5$ and $G_8=50$ μsec each, and $G_9$, $G_{10}$ and $G_{11}=100$ μsec each, and curve 298 of FIG. 5 is the result. In this instance, $F=1$. From Table VII, the region of the dashed curve 298 over which the highest accuracy in τ is required is from 131.3 μsec to 143.8 μsec, this being the τ interval of validity for the particular gate set and F value represented by curve 298. Accordingly, the solid straight-line curve 300 in FIG. 5 is made to fit these points as closely as possible by entering the τ and $R^{-1}$ values in Eq. (1) for each of these points and solving the resulting simultaneous equations for the values of the coefficients a and b. This gives, for the example of FIG. 5 an a value of 61.3 and a b value of 124.1.

A solution of the equation for curve 300 in FIG. 5 i.e., $\tau = 61.3 + 124.1\, R^{-1}$, for the $R^{-1}$ values used in plotting FIG. 5 gives calculated τ values as shown in Table VIII, from which it may be seen that the accuracy of the calculated τ is ±1% or better over approximately a 2-to-1 τ range, namely, from 100 μsec to 200 μsec.

TABLE VIII

| True τ (μsec) | $R^{-1}$ | Calc. τ (μsec) |
|---|---|---|
| 50 | 0.0388 | 66.1 |
| 75 | 0.1520 | 80.2 |
| 100 | 0.3194 | 100.9 |
| 115 | 0.4340 | 115.2 |
| 125 | 0.5133 | 125.0 |
| 137.5 | 0.6139 | 137.5 |
| 150 | 0.7147 | 150.0 |
| 175 | 0.9126 | 174.6 |
| 200 | 1.1014 | 198.0 |

The values of the coefficients a and b for the remaining combinations of F and gates sets of Table VII are determined in a like manner to develop the complete library of expressions of Eq. (1) for use in solving for $\tau_N$ and $\tau_F$, based on respective measured values of $R_N$ and $R_F$. These expressions are also listed in Table VII opposite the corresponding ratio and are also stored in the computer 42 in correspondance with the associated F value and ratio gate set. It will be understood that the values of the coefficients a and b will differ from those set out in Table VII if F values other than $1/\sqrt{3}$, 1, $\sqrt{3}$ and 3 are used or if different gates are used in determining the ratios R.

As mentioned, the counting rates from the various gates used in computing the ratios $R_N$ and $R_F$ are net counting rates over the accumulation period Δt. To obtain the net counting rates, it is necessary to determine the background counting rate and subtract the appropriate amount from the gross gate counting rates. As background counting rate is unknown and varies, it must be estimated. Since the background counting rates generally change slowly, it is permissible to average it over a relatively long time, i.e. 4–8 seconds as compared to a normal accumulation period Δt of 1 second for the gross gate counting rate. It has been found that for the first four sets of gates and equations for each F value in Table VII, it is sufficient to assume that gates 15 and 16 contain only background signal, and the gross counting rates $N_{15}$ and $N_{16}$ from these gates may simply be accumulated and averaged over the background accumulation period and then subtracted from the gross counting rates from the gates to be used in determining the ratios. In the case of the last three gate sets and equations for each F value, however, it has been found necessary to adjust the coefficients a and b to correct for the presence of a small, but significant, amount of decay signal in the gross counting rates of gates 15 and 16. The manner in which this background adjustment is made may be seen by considering, as an example, the case of $F=1$ and $R=(G_7+G_8)/(G_{10}+G_{11}+G_{12}+G_{13})$. First, the true mean counting rates $N_7$, $N_8$, $N_{10}$, etc. in each of the gates $G_7$, $G_8$, $G_{10}$, etc. must be determined. This may be done as described above by use of Eq. (2). For the example at hand, and assuming $\tau=185$ μsec, $A_o=100$ and $F=1$ and using the neutron burst and detection gate times of FIG. 2, Eq. (2) yields the following "true" decay signal count rates (in cps) in each of the gates of interest: $N_7=881.0$, $N_8=672.3$, $N_{10}=526.9$, $N_{11}=306.8$, $N_{12}=178.8$, $N_{13}=164.8$, $N_{15}=18.9$ and $N_{16}=6.4$. The magnitude of the decay signal which would be subtracted from a 200 μsec time gate along with the background, therefore, would be $(N_{15}+N_{16})/2=12.65$ cps. This would give apparent "net" count rates (in cps) for the gates of interest of $N_7(net) = 881.0 - 12.65/4 = 877.8$, $N_8 = 672.3 - 12.65/4 = 669.1$, $N_{10} = 526.9 - 12.65/2 = 520.6$, $N_{11} = 306.8 - 12.65/2 = 300.5$, $N_{12} = 178.8 - 12.65/2 = 172.5$ and $N_{13} = 164.8 - 12.65 = 152.2$. Similarly, for $\tau=210$ μsec (all other parameters remaining the same), Eq. (2) yields true decay signal count rates (cps) of $N_7=1019.2$, $N_8=803.0$, $N_{10}=702.8$, $N_{11}=436.8$, $N_{12}=271.6$, $N_{13}=273$, $N_{15}=40.6$, and $N_{16}=15.7$. Summing the count rates from gates $G_{15}$ and $G_{16}$ and dividing by two, the decay signal subtracted along with background from a 200 μsec gate to obtain the "net" count rate would be 28.15 cps. The respective "net" count rates (in cps) therefore, are $N_7=1012.2$, $N_8=796.0$, $N_{10}=688.7$, $N_{11}=422.7$, $N_{12}=257.5$, $N_{13}=244.9$.

Forming the ratio $R=(N_7+N_8)/(N_{10}+N_{11}+N_{12}+N_{13})$ for both $\tau=185$ $\mu$sec and $\tau=210$ $\mu$sec, the respective values of R are 1.350 and 1.1205, with the corresponding values of $R^{-1}$ being 0.7407 and 0.8925. The two sets of $\tau$'s and R's may then be used to solve for the adjusted values of the coefficients a and b in Eq. (1). This gives a=63.0 and b=164.7, so that if gates $G_{15}$ and $G_{16}$ are used for background, the resulting equation for the gate set $(N_7+N_8)/(N_{10}+N_{11}+N_{12}+N_{13})$ is $\tau=63.0+164.7R^{-1}$. This is not quite identical to the equation for this gate set in Table VII, since that equation was made to fit the "true" $\tau$ vs. $R^{-1}$ curve at $\tau$'s of 187 $\mu$sec and 212.5 $\mu$sec, whereas $\tau$'s of 185 and 210 have been used for the purpose of this example. However, the differences between the two equations are quite minor. It will be appreciated, therefore, that the presence of decay signal in the "background" gates $G_{15}$ and $G_{16}$ may properly be accounted for in the foregoing way for each of the last three gate sets and equations for all F values.

Eq. (7) for K assumes that there is no significant decay signal in gates $G_{15}$ and $G_{16}$, but only background signal. An alternative method of determining K, and one which can be used whether or not there is non-negligible signal mixed with background in gates $G_{15}$ and $G_{16}$, is to calculate a $\Delta R^{-1}$ to go with a $\Delta\tau$, and then solve for K from:

$$\frac{\Delta\tau}{\tau} = K\frac{\Delta R^{-1}}{R^{-1}} \quad (8)$$

For example, to find K for the case of F=1 and $\tau=200$ $\mu$sec using the gate set $(G_7+G_8)/(G_{10}+G_{11}+G_{12}+G_{13})$ and further using gates $G_{15}$ and $G_{16}$ for background, values of $R^{-1}$ are computed as before by solving Eq. (2) for the respective gate counting rates and taking the inverse of the ratio for two values of $\tau$ spaced equally on either side of the $\tau$ in question, i.e. $\tau=200$ $\mu$sec. Hence, for example, for $\tau=213$ $\mu$sec and 187 $\mu$sec, for a $\Delta\tau$ of 26 $\mu$sec, values of $R^{-1}$ of 0.9105 and 0.7527, respectively, are obtained, for a $\Delta R^{-1}$ of 0.1578. For the mean $\tau$ of 200 $\mu$sec, the mean $R^{-1}$ is 0.8316. K is then readily obtained from Eq. (8) by inserting 200 $\mu$sec for $\tau$, 0.8316 for $R^{-1}$, 26 $\mu$sec for $\Delta\tau$ and 0.1578 for $\Delta R^{-1}$, giving for K a value of 0.685. This value is then used in Eq. (6) to determine the fractional standard deviation in $\tau$.

As noted above, the same time gates are used for the far detector 26 as for the near detector 24, i.e., $NG_1=FG_1$, $NG_2=FG_2$, ... $NG_{16}=FG_{16}$, and the same F value, selected on the basis of new $\tau_N$, is also used for both detectors. Likewise, $\tau_F$ is calculated based on the same type of equation as $\tau_N$, i.e., the equations of Table VII, but using of course the counting rates from the far-detector gates. Background correction of the far-detector counting rates, and of the coefficients a and b if needed, is made in the same manner as described above in connection with the near detector. Because $\tau_F$ tends to be larger than $\tau_N$, the first gate chosen for calculating $\tau_F$ is generally less than $2\times\tau_F$ from the end of the neutron burst. While this does not seriously affect the value of $\tau_F$, having the far-detector gates begin closer than $2\times\tau_F$ affords the substantial statistical advantage of significantly increasing the counting rates in the far-detector gates. For instance, if $\tau_F$ is $1.15\times\tau_N$, the far-detector counting rates $F_1, F_2 \ldots F_{16}$ are on the order of 1.3 times higher than would be the case if $\tau_F$ equalled $\tau_N$. The fact of $\tau_F$ being larger than $\tau_N$ does result in relatively more decay signal in gates $FG_{15}$ and $FG_{16}$. This effect, however, does not appear significant, and at the most $\tau_F$ might be decreased as a result thereof by about 1% when $\tau_F=1.15 \tau_N$. An important benefit of $\tau_F$ is that it is substantially free of neutron-diffusion effects. It is, therefore, quite useful for applications where diffusion effects must be considered.

Once $\tau_N$ and $\tau_F$ have been determined, $\Sigma_N$ and $\Sigma_F$ can readily be computed using the expression:

$$\Sigma = 4550/\tau \quad (9)$$

where $\Sigma$ is in capture units and $\tau_N$, or $\tau_F$, is in $\mu$sec. (See U.S. application Ser. No. 955,176 for omitted description.)

Although the invention has been described and illustrated with reference to specific embodiments thereof, many modifications and variations thereof may be made by those skilled in the art without departing from the inventive concepts disclosed. Accordingly, all such modifications and variations are intended to be included within the spirit and scope of the appended claims.

I claim:

1. A method for providing a background-compensated measurement of radiation levels in an earth formation traversed by a borehole, comprising the steps of:
    (a) irradiating an earth formation surrounding the borehole with a discrete burst of neutrons during each of a succession of irradiation intervals;
    (b) detecting, during a first detection time period within each irradiation interval, radiation resulting from a first type of interaction between said neutrons and earth formation elements to be measured and from background sources;
    (c) detecting, during a second detection time period within each irradiation interval, radiation resulting from said background sources;
    (d) measuring the average level of said first-detected radiation over a first measurement period encompassing a plurality of said irradiation intervals;
    (e) measuring the average level of said background radiation over a second measurement period encompassing a greater plurality of said irradiation intervals than said first measurement period; and
    (f) combining said first-detected radiation measurement and said background radiation measurement to compensate said first-detected radiation measurement for the presence within said first detection period of background radiation.

2. The method of claim 1 wherein said first-detected radiation is gamma ray radiation and said background radiation includes radiation resulting from the interaction of said neutrons with the radiation detector materials.

3. The method of claim 1 wherein the level of radiation detected during said first detection time period varies more rapidly with time than does the level of background radiation detected during said second detection time period.

4. The method of claim 1 wherein said first-detected radiation measurement and said background radiation measurement are combined in step (f) by subtracting said background measurement from said first-detected measurement.

5. The method of claim 1 further comprising the steps of:

(g) repeating step (d) at intervals of said first measurement period, said second measurement period being sufficiently long to encompass a plurality of said first measurement periods; and (h) repeating step (f) for each of the first-detected radiation measurements produced in step (g).

6. The method of claim 5 further comprising the steps of:

(i) repeating step (e) at predetermined time intervals to provide new measurements of said background radiation level; and (k) repeating step (h) using the new measurements of step (i) as the background radiation measurements that are combined with the first-detected radiation measurement made pursuant to step (g).

7. The method of claim 1 wherein said first-detected radiation predominately comprises gamma rays resulting from thermal neutron capture interactions between said neutrons and the formation elements; and said background radiation predominately comprises neutron-activation emissions and naturally-occurring gamma rays.

8. A method for obtaining a background-compensated measurement of radiation levels in earth formations traversed by a well bore, comprising:

(a) placing a well tool, having a pulsed neutron source and a radiation detector located therein, in a well bore;

(b) operating said neutron source to irradiate the surrounding earth formations with a discrete burst of neutrons during each of a succession of irradiation intervals;

(c) operating said detector to detect the radiation emanating from the irradiated formations following each neutron burst;

(d) counting in the well tool the number of radiation events detected during a first detection time period within each irradiation interval;

(e) counting in the well tool the number of radiation events detected during a second detection time period within each irradiation interval;

(f) transmitting to the earth's surface representations of the number of counts from each of steps (d) and (e);

(g) separately accumulating at the earth's surface (1) the number of counts from step (d) and (2) the number of counts from step (e);

(h) deriving from the counts accumulated in step (g) (1) a measurement of the average level of said first-detected radiation over a first measurement time period and from the counts accumulated in step (g) (2) a measurement of the average level of said second-detected radiation over a second, longer measurement time period; and (i) combining said first average measurement and said second average measurement to compensate said first average measurement for the presence within said first detection time period of the radiation detected within said second detection time period.

9. The method of claim 8 further comprising the step of separately storing the number of counts from each of steps (d) and (e) in the well tool prior to transmitting said representations to the earth's surface pursuant to step (f).

10. The method of claim 9 wherein the storing step comprises storing the total number of counts from each of steps (d) and (e) over a plurality of irradiation intervals before transmitting said representations to the earth's surface.

11. The method of claim 8 wherein step (a) comprises moving the well tool through the well bore, during the performance of at least steps (b) through (g), at a speed related to the duration of said first measurement time period such that a measurement of the average level of the first-detected radiation is provided pursuant to step (h) at a predetermined depth interval along the well bore.

12. Apparatus for providing a background-compensated measurement of radiation levels in an earth formation traversed by a borehole, comprising:

(a) means for irradiating an earth formation surrounding the borehole with a discrete burst of neutrons during each of a succession of irradiation intervals;

(b) means for detecting, during a first detection time period within each irradiation interval, radiation resulting from a first type of interaction between said neutrons and earth formation elements to be measured and from background sources;

(c) means for detecting, during a second detection time period within each irradiation interval, radiation resulting from said background sources;

(d) means for measuring the average level of said first-detected radiation over a first measurement period encompassing a plurality of said irradiation intervals;

(e) means for measuring the average level of said background radiation over a second measurement period encompassing a greater plurality of said irradiation intervals than said first measurement time period; and (f) means for combining said first-detected radiation measurement and said background radiation measurement to compensate said first-detected radiation measurement for the presence within said first detection period of background-radiation.

13. The apparatus of claim 12 wherein said first-detected radiation is gamma ray radiation and said background radiation includes radiation resulting from the interaction of said neutrons with the radiation detector materials.

14. The apparatus of claim 12 wherein said combining means comprises means for subtracting said second-detected measurement from said first-detected measurement.

15. The apparatus of claim 12 wherein:

the means of paragraph (d) includes means for repeatedly measuring the average level of said first-detected radiation at intervals of said first measurement period, said second measurement period being sufficiently long to encompass a plurality of said first measurement periods; and the means of paragraph (f) include means for combining each said repeated measurement and said background measurement to compensate said each repeated measurement as aforesaid.

16. The apparatus of claim 15 wherein:

the means of paragraph (e) includes means for repeatedly measuring the average level of said background radiation at predetermined time intervals to provide new measurements of said background radiation level; and the means of paragraph (f) includes means for using said new background measurements as the background radiation measurements that are combined with said repeated first-detected radiation measurements.

17. The apparatus of claim 12 wherein said first-detected radiation predominately comprises gamma rays resulting from thermal neutron capture interactions between said neutrons and the formation elements; and said background radiation predominately comprises neutron-activation emissions and naturally-occurring gamma rays.

18. Apparatus for obtaining a background-compensated measurement of radiation levels in earth formations traversed by a well bore, comprising:

(a) a well tool, including a pulsed neutron source and a radiation detector located therein, adapted to be located in a well bore;

(b) means for operating said neutron source to irradiate the surrounding earth formations with a discrete burst of neutrons during each of a succession of irradiation intervals;

(c) means for operating said detector to detect the radiation emanating from the irradiated formations following each neutron burst;

(d) means in the well tool for separately counting (1) the number of radiation events detected during a first detection time period within each irradiation interval and (2) the number of radiation events detected during a second detection time period within each irradiation interval;

(e) means for transmitting to the earth's surface representations of the number of counts from each first detection time period and each second detection time period;

(f) means at the earth's surface for separately accumulating (1) the number of first detection time period counts and (2) the number of second detection time period counts;

(g) means for deriving from the counts accumulated by the means of paragraph (f) a measurement of the average level of said first-detected radiation over a first measurement time period and a measurement of the average level of said second-detected radiation over a second, longer measurement time period; and (h) means for combining said first average measurement and said second average measurement to compensate said first average measurement for the presence within said first detection time period of the radiation detected within said second detection time period.

19. The apparatus of claim 18 further comprising means in the well tool for separately storing the number of first detection time period counts and the number of second detection time period counts prior to transmitting said representations thereof to the earth's surface.

20. The apparatus of claim 19 wherein said storing means includes means for storing the total number of counts from each detection period over a plurality of irradiation intervals before transmitting said representations to the earth's surface.

21. The apparatus of claim 18 further comprising means for moving the well tool through the well bore at a speed related to the duration of said first measurement time period such that a measurement of the average level of the first-detected radiation is provided by the means of paragraph (g) at a predetermined depth interval along the well bore.

* * * * *

UNITED STATES PATENT AND TRADEMARK OFFICE
CERTIFICATE OF CORRECTION

PATENT NO. : 4,267,447
DATED : May 12, 1981
INVENTOR(S) : Charles W. Johnstone

It is certified that error appears in the above—identified patent and that said Letters Patent is hereby corrected as shown below:

Col. 6, lines 1 and 2, "concurrently herewith" should read --Oct. 26, 1978--;
Col. 8, line 41, "nuetron" should read --neutron--;
Col. 9, line 53, "sources" should read --source--;
Col. 12, line 24, "not" should read --now--;
Col. 12, line 55, "(Ti - Ti)" should read --(Tj-Ti)--;
Col. 12, line 65, "($T_B$<<$\tau$)" should read --($T_B$>>$\tau$)--;
Col. 14, line 29, "TABLE" should read --TABLE VII--;
Col. 14, lines 55-56, "$\tau$ < 184.082" should read --$\tau$ < 184.0 $\mu$s--;
Col. 15, line 19, "illustrated" should read --illustrates--;
Col. 16, line 5, "correspondance" should read --correspondence--.

Signed and Sealed this

Third Day of November 1981

[SEAL]

Attest:

GERALD J. MOSSINGHOFF

Attesting Officer

Commissioner of Patents and Trademarks